July 29, 1969 P. R. SMOOT 3,457,658
COLLAPSIBLE CRYSTAL STRUCTURE
Filed April 15, 1966 2 Sheets-Sheet 1
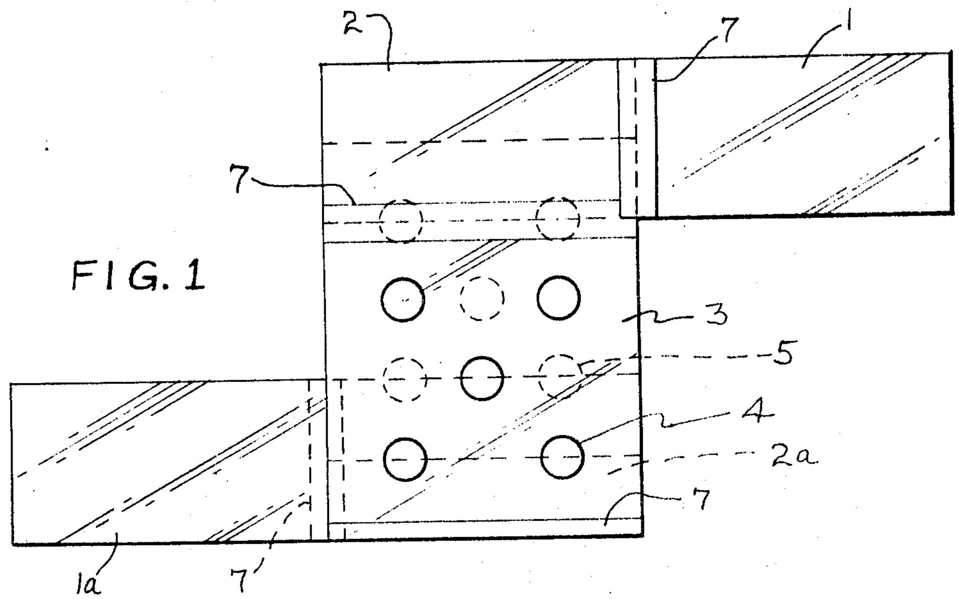
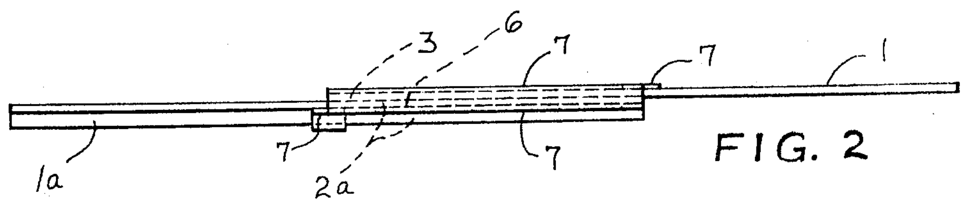
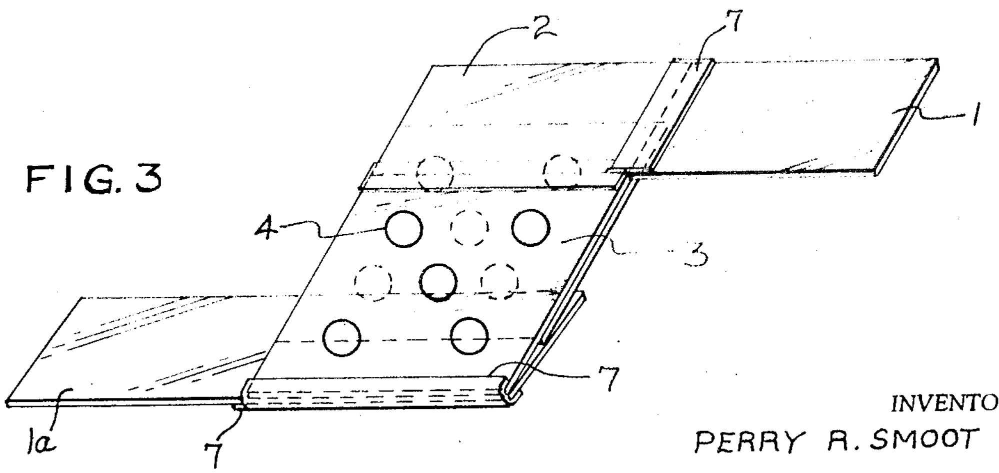
INVENTOR
PERRY R. SMOOT
BY Harry M. Saragovitz,
Edward J. Kelly
& A. J. Dupont
ATTORNEYS

INVENTOR
PERRY R. SMOOT

BY Harry M. Saragovitz,
Edward J. Kelly
& A. J. Dupont
ATTORNEYS 3,457,658
Patented July 29, 1969

3,457,658

COLLAPSIBLE CRYSTAL STRUCTURE

Perry R. Smoot, Wayland, Mass., assignor to the United States of America as represented by the Secretary of the Army Filed Apr. 15, 1966, Ser. No. 543,772
Int. Cl. G09b *23/26*; A63h *33/16*
U.S. Cl. 35—18 3 Claims

ABSTRACT OF THE DISCLOSURE

A collapsible three-dimensional crystal model comprising a plurality of transparent plates having opaque indicias, representing atoms, positioned on at least one of the plates.

The invention described herein may be manufactured and used by or for the Government for governmental purposes, without the payment to me of any royalty thereon.

This invention relates to a collapsible crystal model capable of reduction from a three-dimensional form to a relatively flat, two-dimensional figure.

At the present time, chemical or crystal structure is illustrated for educational or commercial purposes by three-dimensional models comprised of spheres, representing the atoms of the molecular structure, connected by rods or dowels. Although capable of accurately portraying atomic spacial relation, the prior art has several disadvantages. First, the said models are relatively large. Second, they are too expensive for individual distribution. Third, although disassembly is possible, storage of the parts and their possible loss or misplacement present problems. The present invention effectively eliminates the above shortcomings of the prior art without sacrificing any of its instructional value.

It is the primary object of the present invention to provide a model of chemical structure capable of reduction to a form which may be inserted between the leaves of a book. The collapsible nature of the device of the invention permits it to be folded and included as an integral part of textbooks on crystallography to explain and illustrate various crystal structures. Representations of a large number of structures may be included in a small space in a single book.

It is another object to provide a crystal structure capable of low cost production and distribution. The provision for possession of his own structural model by every member of a class of students will raise considerably the educational level of the entire class; not to mention the advantages which accompany the ability of the student to take home his model for study.

Other objects and advantages of the instant invention will become clear upon reference to the following detailed description of the invention, and of its utilization, and to the accompanying drawing.

FIGURE 1 is a top view of the subject invention in its collapsed or closed position;

FIGURE 2 is an end view of the subject invention in its collapsed or closed position;

FIGURE 3 is an orthographic view of the subject invention in its collapsed or closed position;

Figure 4:
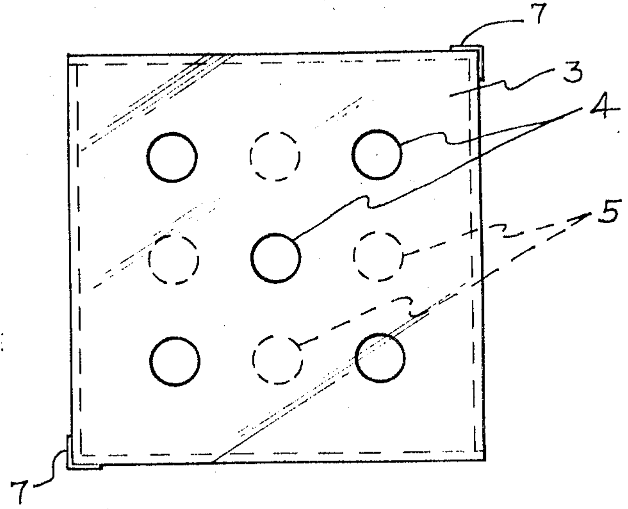
FIGURE 4 is a top view of the subject invention in its extended or open position.
Figure 5:
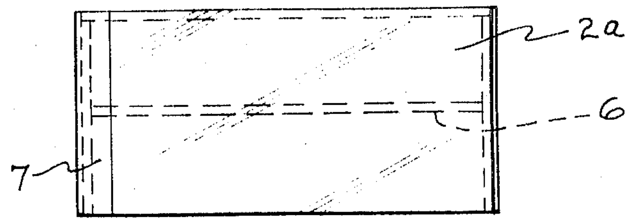
FIGURE 5 is an end view of the subject invention in its extended or open position.
Figure 6:
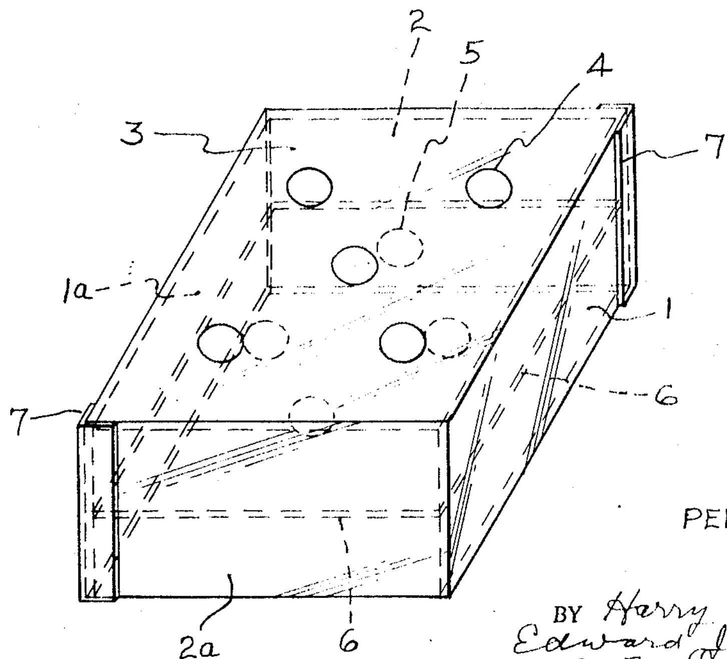
FIGURE 6 is an orthographic view of the subject invention in its extended or open position.

As can be seen from FIGURE 6, the assembled model in its extended or open state—the position it would assume for use as a model of a crystal structure—illustrates a three-dimensional rectangular body with transparent plates forming a top 3, sides 1, 1*a*, ends 2, 2*a* and a bottom 6. As illustrated, the bottom 6 may be recessed or spaced from the lower edges of the sides and ends.

Opaque indicia 4 and 5 are imprinted upon the top 3 of the rectangle and, where called for, on the bottom 6. These indicia 4, 5 representing the atoms of a molecular structure, may be preprinted on the transparent plates or may consist of opaque discs attached to said plates in a predetermined configuration.

The transparent plates may consist of any substance such as plastic or acetate which possesses the requisite qualities of transparency and rigidity. The said plates may be secured to one another by appropriate hinging means, such as translucent tape 7. As shown in FIGURE 1, side 1 is attached at its narrow edge to the narrow edge of end 2. Side 1*a* is similarly secured to end of side 2*a*. Bottom plate 6 is attached at both its narrow edges to ends 2 and 2*a*, as illustrated in FIGURE 6.

FIGURE 1 depicts the subject invention in its collapsed or flat position, as it would be stored in a book. To view the model, the top plate 3 is lifted and the plates 1, 1*a*, which thereby assume a position in a plane at right angles to the top 3, are swung in to form the sides of the solid rectangle and to hold the model in position. The ends 2, 2*a* simultaneously assume a position perpendicular to the top 3 and the bottom 6 retains its position parallel to top 3 but shifts so that its edges are in the same vertical plane as the edges of top 3. During the above process the opaque indicia 4, 5 fixed to the top 3 and bottom 6 move into a predetermined location with a predetermined relation to one another. To close and store the model, the procedure is reversed.

While only preferred forms of the invention are shown and described, other forms of the invention are contemplated and numerous changes and modifications may be made therein without departing from the spirit of the invention as set forth in the appended claims.

What is claimed is:

1. A three-dimensional crystal model comprising two transparent plates arranged in the form of a solid rectangle with a top, a bottom, two ends and two sides of greater length than said ends, said plates having opaque indicia representing atoms on at least one of said plates, and hinging means securing said plates to one another, whereby said model stands in erect position and permits the collapse of said three-dimensional model to a relatively flat, two-dimensional figure.

2. The collapsible crystal model set forth in claim 1, wherein said opaque indicia are imprinted on said top and on said bottom, and said bottom is spaced from the lower edges of said sides and ends.

3. The collapsible crystal model set forth in claim 1, wherein each of said sides is attached to one of said ends on the edge diagonally opposite the edge to which the other side is attached, and said bottom and said top are attached to said ends, thereby permitting collapse of said solid rectangular figure by extending said sides in a plane with said ends and turning one end to form an angle of 180° with said top and said bottom.

(References on following page)

References Cited

UNITED STATES PATENTS

| | | | |
|---|---|---|---|
| 836,296 | 11/1906 | Bitner | 46—21 |
| 990,918 | 5/1911 | Stadler | 46—21 |
| 1,198,524 | 9/1916 | Cunliffe | 46—31 |
| 1,746,595 | 2/1930 | King | 46—21 |
| 3,013,348 | 12/1961 | Casteel | 35—69 |

FOREIGN PATENTS

| | | |
|---|---|---|
| 537,089 | 2/1922 | France. |
| 6,947 | 12/1878 | Germany. |
| 289,615 | 5/1928 | Great Britain. |

OTHER REFERENCES

Smith: "Bibliography on Molecular and Crystal Structure Models," issued by National Bureau of Standards, May 20, 1960, Monograph 14, page 4 only relied on.

Wyckoff: "Simple Model," American Journal of Science, volume 11, May 1926, pp. 377–380 inclusive.

EUGENE R. CAPOZIO, Primary Examiner

H. S. SKOGQUIST, Assistant Examiner

U.S. Cl. X.R.

46—21